(12) United States Patent
Coulmeau et al.

(10) Patent No.: US 7,853,370 B2
(45) Date of Patent: Dec. 14, 2010

(54) METHOD FOR ESTIMATING THE TOUCHDOWN POINT OF THE WHEELS OF AN AIRCRAFT ON A LANDING RUNWAY AND THE DISTANCE TO BE TRAVELED FROM THE TOUCHDOWN POINT TO REACH A CONTROLLED SPEED

(75) Inventors: François Coulmeau, Seilh (FR); Jérôme Sacle, Toulouse (FR)

(73) Assignee: Thales (FR)

( * ) Notice: Subject to any disclaimer, the term of this patent is extended or adjusted under 35 U.S.C. 154(b) by 757 days.

(21) Appl. No.: 11/856,019

(22) Filed: Sep. 15, 2007

(65) Prior Publication Data

US 2008/0162092 A1 Jul. 3, 2008

(30) Foreign Application Priority Data

Sep. 15, 2006 (FR) .................................. 06 08097

(51) Int. Cl.
*G06F 19/00* (2006.01)
*G06F 17/11* (2006.01)

(52) U.S. Cl. ........................................ 701/16; 701/14

(58) Field of Classification Search ..................... 701/3, 701/4, 5, 6, 8, 9, 10, 11, 14, 16; 340/951, 340/945, 972, 973, 979
See application file for complete search history.

(56) References Cited

U.S. PATENT DOCUMENTS

| | | | |
|---|---|---|---|
| 4,316,252 A | 2/1982 | Cooper | |
| 6,317,690 B1 * | 11/2001 | Gia | 701/301 |
| 7,132,960 B2 * | 11/2006 | Glover | 340/945 |
| 2004/0075586 A1 | 4/2004 | Glover | |
| 2004/0167685 A1 | 8/2004 | Ryan et al. | |

FOREIGN PATENT DOCUMENTS

WO    0157827    8/2001

* cited by examiner

*Primary Examiner*—Richard M. Camby
(74) *Attorney, Agent, or Firm*—Lowe Hauptman Ham & Berner, LLP

(57) ABSTRACT

The present invention relates to a method for estimating the touchdown point of the wheels of an aircraft on a landing runway and the distance to be traveled by the aircraft on the runway from the touchdown point to reach a controlled speed below which it can perform any maneuver on the ground. The method comprises an in-flight step of estimating a height and a speed of passage above the threshold of the runway. It also comprises an in-flight step of estimating the touchdown point of the wheels of the aircraft on the landing runway and the distance to be traveled to reach the controlled speed, on the basis of the estimation of the height and the speed of passage above the threshold of the runway. It also comprises a step while going on the runway of estimating the distance to be traveled from the real touchdown point to reach the controlled speed, taking account of the braking forces provided by the brakes, the airbrakes and the thrust reversers.

15 Claims, 3 Drawing Sheets

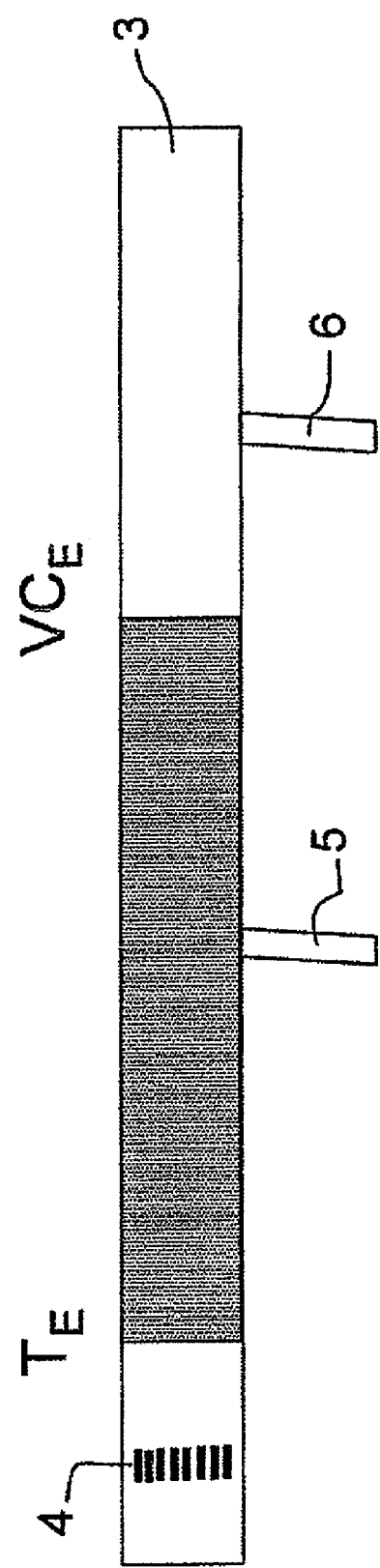

METHOD FOR ESTIMATING THE TOUCHDOWN POINT OF THE WHEELS OF AN AIRCRAFT ON A LANDING RUNWAY AND THE DISTANCE TO BE TRAVELED FROM THE TOUCHDOWN POINT TO REACH A CONTROLLED SPEED

RELATED APPLICATIONS

The present application is based on, and claims priority from, France Application Number 06 08097, filed Sep. 15, 2006, the disclosure of which is hereby incorporated by reference herein in its entirety.

FIELD OF THE INVENTION

The present invention relates to a method for estimating the touchdown point of the wheels of an aircraft on a landing runway and the distance to be traveled by the aircraft on the runway from the touchdown point to reach a controlled speed below which it can perform any maneuver on the ground. It applies for example in the field of avionics.

BACKGROUND OF THE INVENTION

The landing of an aircraft is a phase of the flight that is critical and complex. It requires the pilot to take account of diverse constraints, safety constraints firstly, but also economic constraints and comfort constraints.

First of all, a landing runway comprises several exit linkways spread the whole way along the runway. No exit is actually imposed on the pilot, who remains free to choose his exit depending on the situation which arises and notably depending on the climatic conditions. At best, he leaves the runway by taking one of the first of the exits to save time and to limit the consumption of kerosene on the ground. This additionally makes it possible to minimize the duration for which the runway is occupied. But optimizing runway exit is not an easy thing since numerous parameters come into play: state of the surface, meteorological conditions, weight and state of the craft, notably of the tires and braking system. This is why the choice of the runway exit linkway is not imposed, at the very most suggested by the controller. Finally, it is not enough to apply maximum braking to take the first exit, since this encourages premature wear of the brakes and heats the tires, penalizing the cost-effectiveness of the craft. Not to mention that exaggerated braking is always detrimental to the comfort of the passengers.

A purely manual solution consists initially, just after the main landing gear has touched the ground, in reversing the thrust of the jet engines. Then, subsequently, the pilot brakes by actuating the brake pedals acting on the wheels. The runway exit is chosen by guesswork by the pilot, who visually estimates the first exit that he can reach at a speed less than or equal to the maximum admissible speed for taking this exit. The maximum admissible speed for taking an exit is the speed above which taking the exit presents a risk having regard to the angle that the exit linkway makes with the runway. The maximum speed for taking an exit decreases as the angle increases. This angle may be as much as 90 degrees, this corresponding to a maximum exit speed of the order of 10 to 20 knots.

Another solution consists in the pilot being assisted by an automatic braking system called "auto-brake", which makes it possible to select a deceleration level on an increasing scale varying from 1 to 2, from 1 to 3 or from 1 to 5 according to the airplane model. The system comes on immediately after the nose gear has touched the ground and brakes the airplane until it stops completely while complying with the deceleration level chosen by the pilot. The system is immutable and takes account neither of the particular landing conditions, such as the state of the runway or the meteorological conditions, nor of the speed of the airplane when it touches the ground. It does not guarantee any stopping distance, the latter is variable even for a given deceleration level. It is up to the pilot to compensate for the lack of flexibility of the "auto-brake" system by taking over when he estimates visually that he can take an exit. For this purpose he merely needs to actuate the brake pedals to deactivate the system. The result is then the same as for braking without the assistance of the "auto-brake" system: it is frequently necessary to open the throttle again in order to join an exit further on.

Whether in the case of a purely manual landing or in the case of a landing assisted by the "auto-brake" system, no means are currently available to the pilot enabling him to be certain in advance that the length of runway remaining ahead of the airplane is sufficient and that he will not overshoot the end of the runway. The availability of such information would allow the pilot to judge sufficiently in advance whether it is prudent to open the throttle again so as to take off again and attempt a new approach. Specifically, cases of missed landings are numerous where the pilot realized too late that he was going to overshoot the end of the runway, once down, no longer being able to open the throttle again and go around.

On 2 Aug. 2005 in Toronto, Canada, an airplane of Airbus A340 type with Air France flight number AF358 landed abnormally far along the runway. Despite the thrust reversers and the braking of the wheels, the airplane ended up in a ravine situated 200 meters after the end of the runway, which it crossed while its speed was still 150 kilometers an hour. Fortunately there were no victims, but the airplane was entirely destroyed. Not to mention the hardware cost, the loss is estimated at 75 million dollars.

In 2000 at Fredericton, again in Canada, an airliner of Fokker F-28 type on a Lignes Aériennes Canadiennes Régionales night flight left the end of the runway. This time, no human injury or hardware damage was suffered. The problem identified by the Canadian accident office mentions that the crew had nevertheless indeed been forewarned that the runway was 50% covered by a thin layer of melting snow. However, the decision to land was based mainly on the fact that the other 50% of the runway was only wet. But under such conditions, it is difficult to estimate the braking distance, a wet runway leading notably to aquaplaning during wheel braking. In all cases, the economic, and sometimes even human, consequences of such accidents can be catastrophic.

On the one hand, it appears that only a very small amount of information is currently available to the crew for estimating the risks incurred by landing on a contaminated runway, that is to say one whose surface is totally or partially covered by water, snow or ice. The crew uses braking performance tables which are provided in the technical documentation of the craft. They are available on board in a paper version or on-screen. With a runway state reported by the airport, of the good/average/bad braking type, and/or with a type of contaminant, these tables associate a theoretical braking distance calculated during in-flight trials. Then decisions are taken essentially on the basis of mental calculations and on the experience of the crew on this type of craft.

On the other hand, it is difficult to estimate the point at which the the wheels touch down on the runway, since this point varies with the type of approach and the wind conditions, notably with the tail wind. Now, the point where the airplane will touch the ground conditions the length of runway remaining for it to brake. The theoretical braking distance provided in the tables is calculated by assuming overflight of the runway threshold at 50 feet, the runway threshold being demarcated on the ground by wide paint bands parallel to the axis of the runway and forming a "comb". But principally, the theoretical braking distance is calculated by assuming touchdown 300 meters after the runway threshold. Now, in difficult conditions involving wind, reduced visibility and/or a contaminated runway, it is almost impossible to ensure that these basic assumptions hold. Thus, the real touchdown point may be very far from the theoretical touchdown point 300 meters from the runway threshold. And once the airplane is going on the runway, it may be equally difficult to estimate whether the wheels touched down 300 meters or 600 meters from the runway threshold, or indeed further on still. The risks of overshooting the end of the runway are manifest.

SUMMARY OF THE INVENTION

The aim of the invention is notably to alleviate the aforesaid drawbacks, by permanently providing the crew during the landing phase with a relevant estimation of the touchdown point of the wheels and of the point of controlled speed on a runway in the approach, the controlled speed allowing the airplane which is going on the runway to take any exit linkway, notably those forming a 90-degree turn with the axis of the runway. For this purpose, the invention proposes an innovative expedient based on the cooperation between the flight management system and the braking computers. Thus, the pilot is in a position to decide with maximum anticipation either to open the throttle again so as to take off again, or to increase the braking. For this purpose, the subject of the invention is a method for estimating the touchdown point of the wheels of an aircraft on a landing runway and the distance to be traveled by the aircraft on the runway from the touchdown point to reach a controlled speed below which it can perform any maneuver on the ground. The method comprises an in-flight step of estimating a height and a speed of passage above the threshold of the runway. It also comprises an in-flight step of estimating the touchdown point of the wheels of the aircraft on the landing runway and the distance to be traveled to reach the controlled speed, on the basis of the estimation of the height and the speed of passage above the threshold of the runway. It also comprises a step while going on the runway of estimating the distance to be traveled from the real touchdown point to reach the controlled speed, taking account of the braking forces provided by the brakes, the airbrakes and the thrust reversers.

The estimation of the height and speed of passage above the threshold of the runway can for example be obtained by comparing a real vertical descent profile and a theoretical vertical descent profile or can advantageously be provided instantaneously by sensors.

The estimation of the touchdown point of the wheels and of the distance to be traveled to reach the controlled speed on the basis of the height and speed of passage above the runway threshold can for example be calculated by using a predictive mathematical model or can advantageously be achieved without calculation by using a pre-established performance table.

For consideration in estimating the distance from the touchdown point of the wheels and the distance to be traveled to reach the controlled speed, sensors can instantaneously provide the engine speed and/or the position of the thrust reversers and/or the position of the flaps and/or the position of the spoilers and/or the force provided by the brakes. Advantageously, the sensors can also provide the failure state of the these hardware items.

The pre-established performance table can depend on the state of contamination of the runway or landing assistance functions available on the runway.

In an embodiment, the calculation of the touchdown point of the wheels can be refined when the aircraft passes substantially above the threshold of the runway.

Advantageously, the touchdown point of the wheels and/or the distance to be traveled to reach the controlled speed can be continually re-estimated as soon as the aircraft begins a flareout maneuver allowing it to progressively decrease its descent speed towards the runway.

In an embodiment, the point at which the controlled speed ought to be reached can be continually re-estimated on the basis of the real touchdown point as soon as the wheels of the aircraft have actually touched the runway.

For example, the estimations of the touchdown point of the wheels and/or of the point at which the controlled speed ought to be reached can be displayed graphically, possibly accompanied by the exit linkways of the runway.

Advantageously, the method can be implemented in an FMS flight management system.

The main advantages of the invention are again that it makes it possible to optimize the use of the brakes and thrust reversers, and notably to minimize their wear and maximize their longevity. The maintenance savings made are not negligible. Reassuring for the pilot, the invention also makes it possible to substantially improve the comfort of the passengers on landing, by sparing them from the arduous load factors due to braking unsuited to the situation.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will appear with the aid of the description which follows offered in relation to appended drawings which represent.

DETAILED DESCRIPTION OF THE DRAWINGS

Figure 1:
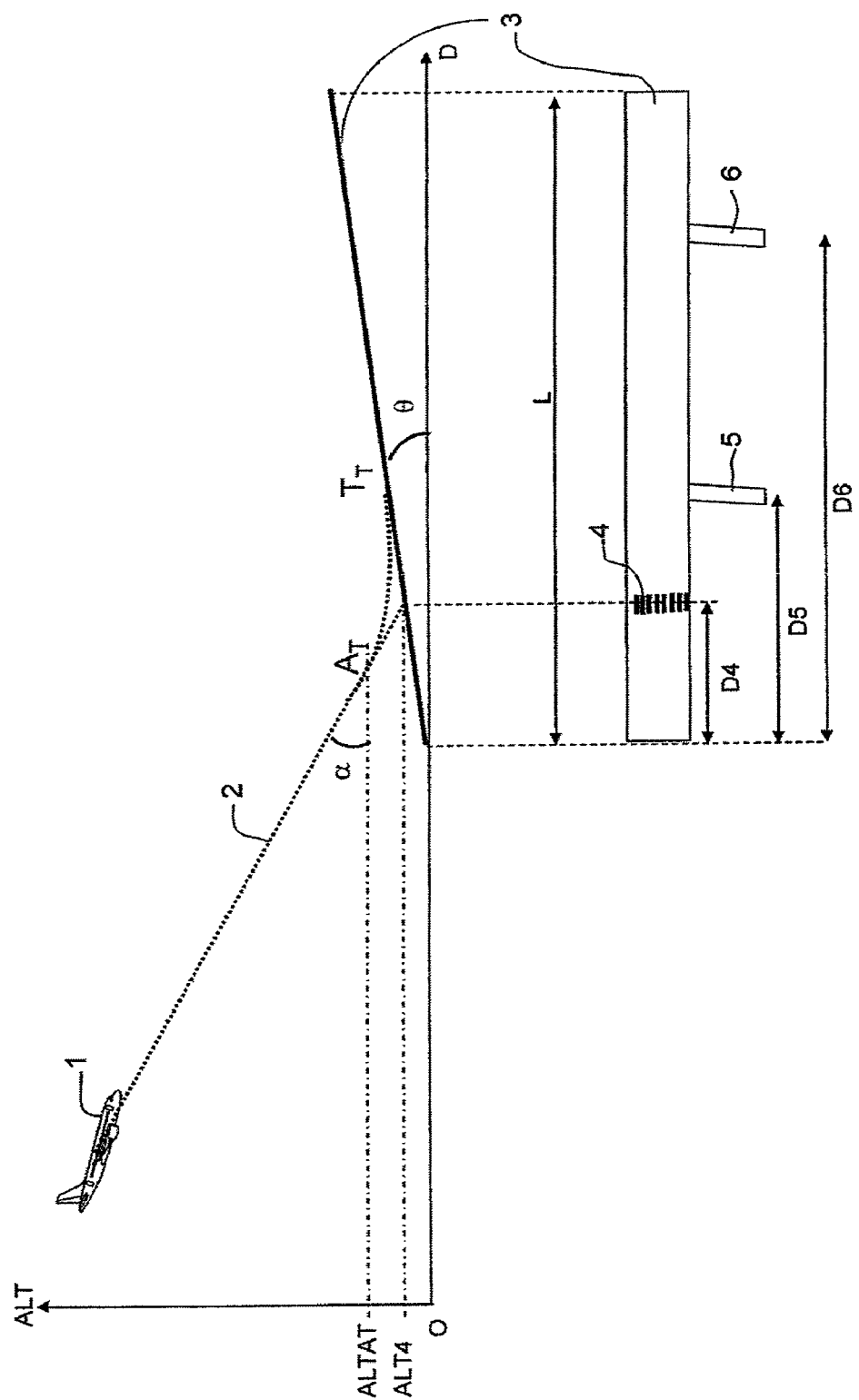
FIG. 1, via a lateral view and a view from above, an exemplary airplane following a theoretical vertical descent profile down towards a landing runway, FIG. 2, via a chart an exemplary system architecture able to implement the method according to the invention, FIG. 3, an exemplary graphical display of a touchdown point of the wheels and of a controlled-speed point that are estimated by the method according to the invention.

FIG. 1 illustrates schematically an airplane 1 following a theoretical vertical profile 2 descending towards a runway 3. The runway 3 is illustrated by a lateral view and by a view from above. The theoretical vertical profile 2 is a trajectory portion extracted from the flight plan of the airplane 1. For example, the airplane may have a computerized flight management system that will subsequently be called the FMS, which manages notably its flight plan. The flight plan contains a reference trajectory to be followed by the airplane 1. The FMS makes this reference trajectory available to the other onboard systems, notably to the automatic pilot as well as to the piloting personnel by way of display and input interfaces. It involves a chronological sequence of named waypoints described by a position, an altitude and an overfly time. The reference trajectory is a valuable aid both to the control personnel on the ground and to the pilot, for best anticipating the movements of the airplane and ensuring an optimum safety level. Notably, the reference trajectory makes it possible to deduce the theoretical vertical profile 2, which indicates all the altitude changes envisaged from the departure airport up to the destination airport. The part of the theoretical vertical profile 2 that is illustrated by FIG. 1 is the final part corresponding to the approach phase descending towards the runway 3. It is calculated by the FMS as soon as the runway to be used to land on the destination airport is known. In the example of FIG. 1, the runway 3 is dispatched by the ground controller and input to the FMS by the co-pilot. The FMS takes into account a descent slope α associated with the runway 3 in a navigation database available aboard or a default slope of 3 degrees.

The theoretical vertical profile 2 and the lateral view of the runway 3 are represented in a system of axes where the ordinate axis represents an altitude ALT and where the abscissa axis is parallel to the axis of the runway 3 and represents a distance on the ground D. The runway 3 has a total length L and a runway threshold 4 demarcated on the ground by a "comb". The threshold 4 is situated at a distance D4 from the start of the runway and at an altitude ALT4. The altitude ALT4 of the threshold 4 is the altitude commonly used as altitude of the runway 3, so as to circumvent a negligible slope 0 ensuing from the relief. Exit linkways 5 and 6 are situated respectively at distances D5 and D6 from the start of the runway.

The theoretical vertical profile 2 arising from the FMS predicts a descent of the airplane 1 towards the runway 3 following a rectilinear trajectory down to a theoretical start-of-flareout point $A_T$, then following a flareout trajectory between the point $A_T$ and a theoretical touchdown point $T_T$ at which the wheels of the airplane 1 touch down on the runway 3. Subsequently, the trajectory portion situated between the point $A_T$ and the point $T_T$ will be called the "theoretical flareout". The theoretical flareout is estimated by the FMS by assuming passage 50 feet above the threshold 4 and touchdown of the wheels 300 meters beyond the threshold 4. In particular, the FMS estimates an altitude ALTAT at which the airplane 1 must theoretically begin its flareout. But for various reasons, notably reasons of an operational nature that are imposed by ground control, the airplane 1 does not follow the theoretical vertical profile 2 perfectly. Very often, it flies markedly above or markedly below.

Figure 2:
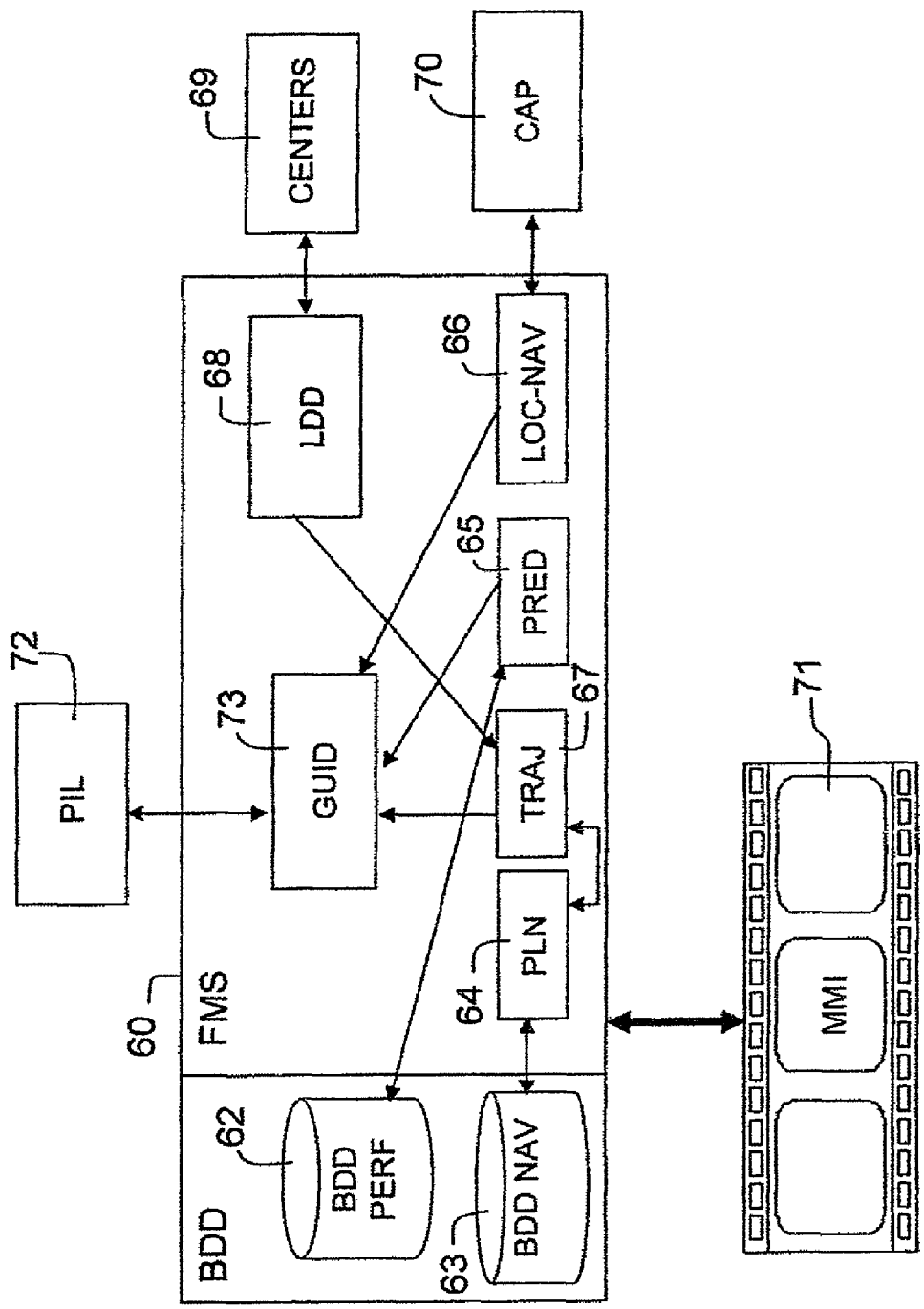

FIG. 2 illustrates via a chart an exemplary system architecture advantageously making it possible to implement the method according to the invention within an FMS system 60 available aboard the airplane 1. A digitized data link module LDD 68 receives guidance instructions from ground control centers represented by a module 69. The module 68 provides these guidance instructions to a trajectography module TRAJ 67. The module 67 also receives the flight plan from a flight plan management module PLN 64, the module 64 converting the aeronautical beacons describing the flight plan by virtue of a navigation database BDD NAV 63. The trajectography module 67 constructs the reference trajectory of the airplane 1 on the basis of the waypoints of the flight plan while complying with the performance of the airplane 1 and the confinement constraints for the air routes followed. It is therefore also the module 67 which formulates the theoretical vertical profile 2. The module 67 dispatches the up-to-date reference trajectory to a guidance module GUID 73. A location and navigation module LOC-NAV 66 provides the module 73 with the instantaneous kinematic characteristics of the airplane 1 in terms of position, altitude and speed. The module 66 itself receives raw data from a module CAP 70 that bundles together sensors, of the satellite-based positioning beacon and/or inertial platform type. A prediction module PRED 65 provides the module 73 with the scheduled times of passage at the points marking out the trajectory to be followed, these points determining the timetable to be complied with, as well as the scheduled points of change of kinematics. It also formulates a real vertical approach profile, which is that actually followed by the airplane 1 having regard to the real operational situation. To perform its calculations, the module 65 receives the aircraft performance from a database BDD PERF 62. The module 73 dispatches the guidance instructions to a piloting module PIL 72 for automatic application. A man-machine interface module MMI 71 provides services for display and input within the framework of the functionalities of the FMS 60. It is in the module 65 that a new function implementing the method according to the invention can advantageously be added.

Initially, during the preparation for the approach, the function according to the invention implemented in the module 65 must be initialized with landing parameters. The crew enters these parameters by way of the interface module 71. This involves for example the braking coefficient or the state of the runway of the type bad/average/good provided by messages received from the ground. This can also involve the fact that the use of the thrust reversers is or is not envisaged, or else the slope of the runway. The function according to the invention can also acquire in an automatic manner other parameters made available by other systems, such as for example the length and the altitude of the runway, the "auto-brake" mode selected (deactivated, average, low), the actual wind, the deflection values for the flaps. The advantage of being able to receive certain parameters automatically on the part of other systems, such as the spoilers arming parameters, is to reduce the workload of the crew, notably for configuring the function. It should be noted that if the "auto-brake" system is deactivated, the function takes into account a manual braking average deceleration, based on a statistical or calculational procedure.

Subsequently, during the approach and on the basis of the landing parameters previously entered, the function according to the invention carries out a first estimation of the height and speed of passage above the threshold 4 of the runway 3. From this it deduces a first estimation of the touchdown point of the wheels and of the controlled-speed point. For example, the function can consider a controlled speed equal to 20 knots.

If the automatic piloting module 72 has a mode termed "managed", it can slave the airplane 1 to the reference trajectory with which it is provided by the trajectography module 67, and therefore in particular to the part of the theoretical vertical profile 2 for descending towards the runway 3. In this case, the function according to the invention can compare the real vertical approach profile already formulated by the module 65 which gathers it with the theoretical vertical profile 2 already formulated by the module 67, notably to determine whether the theoretical vertical profile 2 will be joined before or after passing above the threshold 4. The function can deduce therefrom the height on passing above the threshold 4, as well as the speed on passing above the threshold 4.

If the automatic piloting module 72 has a mode termed "selected", it can slave the airplane 1 to instantaneous flight instructions given by the pilot, for example to a vertical descent speed instruction. In this case, the function according to the invention can determine the height and the speed of the airplane 1 on passing above the threshold 4 by using measured values of the flight parameters of the airplane 1, such as its speed relative to the ground, its vertical speed and its height obtained by a radio probe. The function according to the invention can proceed in the same manner when the airplane 1 is descending by manual piloting.

Once the height and the speed on passing above the threshold 4 have been estimated, the function according to the invention can for example use a simple predictive mathematical model making it possible to deduce the flareout distance to which the touchdown point corresponds from the start-of-flareout point and the braking distance to which the controlled-speed point corresponds from the touchdown point. Very conventionally, the flareout distance and the braking distance can be calculated by applying the theorem of dynamics to the airplane 1. Thereafter it suffices to project the associated vector equation into the system of axes (O, D, ALT) and to solve the resulting system of equations. However, the function according to the invention can also be advantageously based on the use of pre-established performance tables. Notably, in the technical documentation of the airplane 1 in the performance section, landing distances have been calculated as a function of various flight parameters. For example, these distances can be given tables with several inputs, each input corresponding to a flight parameter taken into account in the calculations. The flight parameters can for example be the engine speed and the position of the thrust reversers of the airplane 1, the force provided by the brakes of the airplane 1, the position of the flaps and spoilers of the airplane 1 or else the auto-brake mode selected. The actual values of these flight parameters can then be measured and provided by dedicated sensors, which can also advise the function according to the invention about the failure state of the hardware that they monitor. The performance tables can also take account of the altitude ALT4, the slope θ and the state of contamination of the runway 3, the state of contamination reflecting the fact that the surface of the runway 3 is clear or conversely is totally or partially covered by water, snow or ice. Advantageously, the performance tables can also depend on the wind blowing over the runway 3 and the state of activation of landing assistance functions available on the runway 3. The use of such tables can therefore be an effective alternative to the calculations.

FIG. 3 illustrates an exemplary graphical display of an estimated touchdown point of the wheels $T_E$ and of an estimated point of controlled speed $VC_E$ on the runway 3. Specifically, right from the approach phase, the estimated touchdown point of the wheels $T_E$ and the estimated point of controlled speed $VC_E$ on the runway 3 can be presented to the crew by display on a screen of the module 71. For example, this can be on the horizontal navigation screen commonly called the "Navigation Display" and which will be called ND subsequently. With a scale making it possible to represent the runway 3 graphically with appreciable accuracy, the zone of the runway 3 situated between the estimated touchdown point $T_E$ and the estimated point of controlled speed $VC_E$ can be characterized by a particular color. Thus, the crew can forthwith be sure of the margin with respect to the end of the runway 3 and possibly take corrective measures, that is to say to open the throttle again or envisage increasing the braking forces. The threshold 4 as well as the exit linkways 5 and 6 are also displayed graphically, thereby making it possible to rapidly ascertain the linkways that are situated beyond the controlled-speed point and that may therefore be used to exit the runway.

Slightly before the airplane 1 passes above the threshold 4 of the runway 3, ideally round about the decision altitude, the function according to the invention passes to a more accurate mode. Specifically, at this final juncture of the approach the function has more accurate data, both regarding the forecast of the height of passage above the threshold 4 and regarding the wind blowing over the runway 3, even if the wind shear parameters might still vary. The calculation of the flareout distance corresponding to the estimated touchdown point $T_E$ can therefore advantageously be refined, again on the basis of the simple predictive mathematical model used previously and/or of tables. It should be noted that in this step, the calculation of the braking distance from the estimated touchdown point $T_E$, which corresponds to the estimated point of controlled speed $VC_E$, remains unchanged. The crew therefore sees the estimated touchdown point $T_E$ and the estimated point of controlled speed $VC_E$ slide gently and in unison along the graphical representation of the runway 3 on the screen.

When the airplane 1 commences its flareout, the function according to the invention can still use the simple predictive mathematical model and/or the tables previously used to refine its estimations of the touchdown point $T_E$ and controlled-speed point $VC_E$. During the flareout phase, the function continually updates its estimations, the latter being updated instantaneously on the screen ND. Audible or visual alert mechanisms can also make it possible to attract the co-pilot's attention as early as possible in the case where the estimated touchdown point $T_E$ and/or the controlled-speed point $VC_E$ were to vary in a manner incompatible with a completely safe landing on the runway 3. This makes it possible to envisage a go-around with maximum anticipation. In the function according to the invention, the flareout phase is a major phase for aiding the decision as to whether or not to go around.

As soon as the wheels of the airplane 1 have touched the runway 3, the function according to the invention recalculates the braking distance that makes it possible to reach the controlled speed. For this purpose, it still uses the previously used simple predictive mathematical model and/or the tables giving braking distances. The braking distance making it possible to reach the controlled speed can be continually re-estimated throughout the braking phase. The estimated point of controlled speed $VC_E$ can then be updated instantaneously on the screen ND, the latter being closely monitored by the co-pilot. This makes it possible to decrease or to increase the braking forces as a function of the remaining usable distance on the runway 3. In the function according to the invention, the phase of going on the runway is a phase for aiding the use of the braking means.

The invention previously described can also be a valuable aid to airport management, the crew being able to inform the control tower in a much more reliable manner about the runways that they can take and the one that they cannot take, having regard to the exterior conditions and the real performance of the craft, doing so even before the wheels have been placed on the runway.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of estimating the touchdown point of the wheels of an aircraft having brakes, airbrakes and reverse thrusters on a landing runway and the distance to be travelled by the aircraft on the runway from the touchdown point to reach a controlled speed below which it can perform any maneuver on the ground, which comprising the following steps:

first estimating, in-flight, a height and a speed of passage above the threshold of the runway;

second estimating, in-flight, the touchdown point of the wheels of the aircraft on the landing runway and a distance to be ravelled to reach the controlled speed, on the basis of the estimation of the height and the speed of passage above the threshold of the runway;

third estimating while going on the runway, the distance to be travelled from the real touchdown point to reach the controlled speed, taking account of the braking forces provided by the brakes, the airbrakes and the thrust reversers.

2. The method as claimed in claim 1, wherein the estimation of the height and speed of passage above the threshold of the runway is obtained by comparing a real vertical descent profile and a theoretical vertical descent profile.

3. The method as claimed in claim 1, wherein the estimation of the height and speed of passage above the threshold of the runway is provided instantaneously by sensors.

4. The method as claimed in claim 1, wherein the estimation of the touchdown point of the wheels and of the distance to be travelled to reach the controlled speed on the basis of the height and speed of passage above the runway threshold is achieved by calculation by using a predictive mathematical model.

5. The method as claimed in claim 1, wherein the estimation of the touchdown point of the wheels and of the distance to be travelled to reach the controlled speed on the basis of the height and speed of passage above the runway threshold is achieved without calculation by using a pre-established performance table.

6. The method as claimed in claim 1, wherein sensors instantaneously provide the engine speed and/or the position of the thrust reversers and/or the position of the flaps and/or the position of the spoilers and/or the force provided by the brakes, for consideration in estimating the distance from the touchdown point of the wheels and the distance to be travelled to reach the controlled speed.

7. The method as claimed in claim 1, wherein sensors instantaneously provide the failure state of the engines and/or of the thrust reversers and/or of the flaps and/or of the spoilers and/or of the brakes, for consideration in estimating the distance from the touchdown point of the wheels and the distance to be travelled to reach the controlled speed.

8. The method as claimed in claim 5, wherein the pre-established performance table depends on the state of contamination of the runway.

9. The method as claimed in claim 5, wherein the pre-established performance table depends on landing assistance functions available on the runway.

10. The method as claimed in claim 1, wherein the calculation of the touchdown point of the wheels is refined when the aircraft passes substantially above the threshold of the runway.

11. The method as claimed in claim 1, wherein the touchdown point of the wheels and/or the distance to be ravelled to reach the controlled speed are continually re-estimated as soon as the aircraft begins a flareout maneuver allowing the aircraft to progressively decrease its descent speed towards the runway.

12. The method as claimed in claim 1, wherein the point at which the controlled speed ought to be reached is continually re-estimated on the basis of the real touchdown point as soon as the wheels of the aircraft have actually touched the runway.

13. The method as claimed in claim 1, wherein the estimations of the touchdown point of the wheels and/or of the point at which the controlled speed ought to be reached are displayed graphically.

14. The method as claimed in claim 1, wherein exit linkways of the runway are displayed graphically with the point at which the controlled speed ought to be reached.

15. The method as claimed in claim 1, wherein the method is implemented in an flight management system FMS.

* * * * *